US011865393B2

(12) United States Patent
Monfils et al.

(10) Patent No.: US 11,865,393 B2
(45) Date of Patent: *Jan. 9, 2024

(54) FIRE-FIGHTING FOAM COMPOSITION

(71) Applicant: Tyco Fire Products LP, Lansdale, PA (US)

(72) Inventors: JoAnna M. Monfils, Peshtigo, WI (US); John P. Libal, Peshtigo, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,653

(22) Filed: Mar. 14, 2022

(65) Prior Publication Data

US 2022/0362602 A1 Nov. 17, 2022

Related U.S. Application Data

(60) Provisional application No. 63/288,024, filed on Dec. 10, 2021, provisional application No. 63/288,020, filed on Dec. 10, 2021, provisional application No. 63/288,026, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.
*A62D 1/02* (2006.01)
*A62C 99/00* (2010.01)

(52) U.S. Cl.
CPC ........ *A62D 1/0071* (2013.01); *A62C 99/0036* (2013.01)

(58) Field of Classification Search
None
See application file for complete search history.

(56) References Cited

U.S. PATENT DOCUMENTS 3,956,138 A 5/1976 Crockett
4,060,489 A 11/1977 Chiesa, Jr.
4,398,605 A 8/1983 Conklin et al.
4,410,508 A 10/1983 Brown et al.
5,218,021 A 6/1993 Clark et al.
5,225,095 A 7/1993 Dimaio et al.
5,296,164 A 3/1994 Thach et al.
5,391,721 A 2/1995 Hanen et al.
5,434,192 A 7/1995 Thach et al.
5,496,475 A 3/1996 Jho et al.
5,616,273 A 4/1997 Clark et al.
5,706,895 A 1/1998 Sydansk
5,882,541 A 3/1999 Achtmann
5,997,758 A 12/1999 Barbarin et al.
6,262,128 B1 7/2001 Stern et al.
6,599,872 B1 7/2003 Hubert et al.
7,005,082 B2 2/2006 Clark
7,011,763 B2 3/2006 Clark
7,135,125 B2 11/2006 Clark
7,172,709 B2 2/2007 Clark
7,199,083 B2 4/2007 Zevallos
7,271,133 B2 9/2007 Weaver et al.
7,334,640 B2 2/2008 Hanes et al.
7,381,696 B2 6/2008 Hubert et al.
7,541,316 B2 6/2009 Maresh
7,569,155 B2 8/2009 Schaefer
7,588,645 B2 9/2009 Griese et al.
7,888,297 B2 2/2011 Hanes et al.
7,888,308 B2 2/2011 Swazey
7,994,111 B2 8/2011 Caggioni et al.
8,043,999 B2 10/2011 Sullivan et al.
8,076,270 B2 12/2011 Smith et al.
8,207,094 B2 6/2012 Hutchins et al.
8,298,436 B2 10/2012 Michael
8,366,955 B2 2/2013 Thomas et al.
8,413,721 B2 4/2013 Welton et al.
8,524,104 B1 9/2013 Michael
8,703,691 B2 4/2014 Caggioni et al.
8,772,359 B2 7/2014 Swazey
8,783,374 B2 7/2014 Rains et al.
9,045,716 B2 6/2015 Swazey et al.
9,259,602 B2 2/2016 Robinet et al.
9,289,636 B2 3/2016 Mathis
9,420,784 B2 8/2016 Vanlaer et al.
9,487,661 B2 11/2016 Johnson et al.
9,662,522 B2 5/2017 Liu et al.
9,669,246 B2 6/2017 Bowen et al.
9,675,828 B1 6/2017 Sery
9,687,686 B2 6/2017 Blunk et al.
9,776,029 B2 10/2017 Izumida et al.
9,956,447 B2 5/2018 Martin et al.
9,956,448 B2 5/2018 Martin
10,030,214 B2 7/2018 Swazey et al.
10,071,273 B2 9/2018 Hansen et al.
10,159,863 B2 12/2018 Mariampillai et al.
10,173,089 B2 1/2019 Xie
10,214,708 B2 2/2019 Swazey et al.
10,328,297 B2 6/2019 Bowen et al.
10,335,624 B2 7/2019 Libal
10,369,394 B2 8/2019 Bowen
10,369,395 B2 8/2019 Bowen et al.
(Continued)

FOREIGN PATENT DOCUMENTS

CN 1599633 A 3/2005
CN 101198381 A 6/2008
(Continued)

OTHER PUBLICATIONS

Derwent-Acc-No. 2020-69248T as Abstract for WO 2020149733 A1 (Jul. 2020).*
(Continued)

*Primary Examiner* — Joseph D Anthony
(74) *Attorney, Agent, or Firm* — Foley & Lardner LLP

(57) ABSTRACT

An aqueous fire-fighting composition includes a sugar component, anionic surfactant, zwitterionic surfactant, organic solvent and polysaccharide thickener is provided. The composition does not contain any amine oxide or nonionic surfactants and is substantially free of fluorinated compounds. Methods of using the composition to form a fire-fighting foam and fighting a fire with the firefighting foam are also provided.

20 Claims, No Drawings

(56) References Cited

U.S. PATENT DOCUMENTS

| | | | |
|---|---|---|---|
| 10,443,019 | B2 | 10/2019 | Fossum et al. |
| 10,457,900 | B2 | 10/2019 | Fossum et al. |
| 10,494,592 | B2 | 12/2019 | Applegate et al. |
| 10,518,120 | B2 | 12/2019 | Pai et al. |
| 10,625,108 | B2 | 4/2020 | Mariampillai et al. |
| 10,653,910 | B2 | 5/2020 | Da Costa et al. |
| 10,780,305 | B2 | 9/2020 | Xie et al. |
| 10,870,030 | B2 | 12/2020 | Libal |
| 10,940,352 | B2 | 3/2021 | Worsman |
| 11,065,490 | B2 | 7/2021 | Lavergne et al. |
| 11,173,334 | B2 | 11/2021 | Xie et al. |
| 2002/0014610 | A1 * | 2/2002 | Tanaka ................. A62D 1/0071 252/3 |
| 2003/0201419 | A1 * | 10/2003 | Tanaka ................. A62D 1/0057 252/3 |
| 2004/0006175 | A1 | 1/2004 | Diener et al. |
| 2005/0113272 | A1 | 5/2005 | Yeung et al. |
| 2007/0256836 | A1 | 11/2007 | Welton et al. |
| 2008/0108541 | A1 | 5/2008 | Swazey |
| 2008/0196908 | A1 | 8/2008 | Schaefer |
| 2011/0097294 | A1 | 4/2011 | Anthony et al. |
| 2013/0313465 | A1 | 11/2013 | Podella et al. |
| 2014/0138104 | A1 | 5/2014 | Robinet et al. |
| 2016/0107015 | A1 | 4/2016 | Cheng |
| 2017/0056698 | A1 * | 3/2017 | Pai ....................... A62D 1/0042 |
| 2017/0259099 | A1 | 9/2017 | Blunk et al. |
| 2018/0325141 | A1 * | 11/2018 | Nakajima .............. A21D 13/50 |
| 2018/0361185 | A1 | 12/2018 | Siem |
| 2019/0008187 | A1 | 1/2019 | Konda et al. |
| 2019/0262647 | A1 | 8/2019 | Havelka-Rivard et al. |
| 2019/0314660 | A1 | 10/2019 | Chirac et al. |
| 2020/0094093 | A1 | 3/2020 | Worsman et al. |
| 2020/0101340 | A1 * | 4/2020 | Worsman ................. A62D 1/00 |
| 2020/0139180 | A1 | 5/2020 | Lovas |
| 2020/0206552 | A1 | 7/2020 | Mariampillai et al. |
| 2020/0215372 | A1 | 7/2020 | Lavergne et al. |
| 2020/0368570 | A1 | 11/2020 | Hodgen et al. |
| 2021/0009787 | A1 | 1/2021 | Hulbert et al. |
| 2021/0046347 | A1 * | 2/2021 | LaVergne ............... A62C 31/12 |
| 2021/0128431 | A1 | 5/2021 | Sartingen et al. |
| 2021/0146182 | A1 | 5/2021 | Hugener |
| 2021/0154512 | A1 | 5/2021 | Libal |
| 2021/0187337 | A1 | 6/2021 | Worsman |
| 2021/0283449 | A1 | 9/2021 | Lavergne et al. |
| 2022/0134158 | A1 | 5/2022 | Havelka-Rivard et al. |
| 2022/0411644 | A1 | 12/2022 | Rhoades et al. |

FOREIGN PATENT DOCUMENTS

| | | | | |
|---|---|---|---|---|
| CN | 105056458 | A | 11/2015 | |
| CN | 112675469 | A | 4/2021 | |
| WO | WO-2008/058324 | A1 | 5/2008 | |
| WO | WO-2011/050980 | A2 | 5/2011 | |
| WO | WO-2016/075480 | A1 | 5/2016 | |
| WO | WO-2016/082041 | A1 | 6/2016 | |
| WO | WO-2018/022763 | A1 | 2/2018 | |
| WO | WO-2018/134393 | A1 | 7/2018 | |
| WO | WO-2018/234647 | A1 | 12/2018 | |
| WO | WO-2019/202045 | A1 | 10/2019 | |
| WO | WO-2020/033255 | A1 | 2/2020 | |
| WO | WO-2020/084277 | A1 | 4/2020 | |
| WO | WO-2020/109654 | A1 | 6/2020 | |
| WO | WO-2020/144579 | A1 | 7/2020 | |
| WO | WO-2020/149733 | A1 | 7/2020 | |
| WO | WO 2020149733 | A1 * | 7/2020 | ............. C09K 8/594 |
| WO | WO-2020/217126 | A1 | 10/2020 | |
| WO | WO-2020/247780 | A1 | 12/2020 | |
| WO | WO-2021/099308 | A1 | 5/2021 | |
| WO | WO-2022/094399 | | 5/2022 | |

OTHER PUBLICATIONS

International Search Report and Written Opinion on PCT Appl. Ser. No. PCT/IB2022/053618 dated Jul. 22, 2022 (13 pages).

Derwent Acc. No. 2020-69248T; Chai, et al; "Composition with Foaming Properties"; Derwent; Abstract for WO2020/149733A1; dated Jul. 23, 2020; 4 pages.

International Search Report and Written Opinion on PCT Appl. Ser. No. PCT/IB2022/053615 dated Jul. 26, 2022 (13 pages).

International Search Report and Written Opinion on PCT Appl. Ser. No. PCT/IB2022/053619 dated Jul. 29, 2022 (14 pages).

International Search Report and Written Opinion on PCT Appl. Ser. No. PCT/IB2022/053620 dated Jul. 29, 2022 (14 pages).

International Search Report and Written Opinion on PCT Appl. Ser. No. PCT/IB2022/053621 dated Jul. 29, 2022 (15 pages).

* cited by examiner

FIRE-FIGHTING FOAM COMPOSITION

CROSS-REFERENCE TO RELATED APPLICATIONS

This application claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; and 63/288,026, filed on Dec. 10, 2021 the contents of which are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated surfactants. There is a strong desire in the marketplace to replace these fluorinated firefighting products with non-fluorinated products. There is therefore a continuing need to produce non-fluorinated firefighting compositions, also known as synthetic fluorine-free foams or SFFF that can be deployed to fight Class A and Class B fires.

SUMMARY

The present application is directed to aqueous fire-fighting foam compositions, typically in concentrated form, which can be diluted with an aqueous diluent to provide a foam precursor composition. The more dilute foam precursor composition may be aerated to form a firefighting foam. The aqueous fire-fighting composition includes a sugar component, anionic surfactant, zwitterionic surfactant, organic solvent and polysaccharide thickener. The application also provides a method of fighting a fire with the firefighting foam.

The present aqueous firefighting compositions typically include a sugar component substantially in the form of a monosaccharide sugar and/or a sugar alcohol; together with a surfactant component containing anionic surfactant and/or zwitterionic surfactant. The surfactant component is substantially free of and, often, does not contain any amine oxide or nonionic surfactant. The aqueous firefighting compositions may also include an organic solvent, e.g., a water-miscible organic solvent such as an alkylene glycol, glycerol, a water-soluble polyethylene glycol and/or a glycol ether. The composition may be substantially free of any fluorinated compound. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. The aqueous firefighting foam compositions of the present disclosure are substantially free of fluorine. As used herein, the phrase "substantially free of fluorine" means that the composition has a total concentration of fluorine atoms on a weight percentage basis of no more than about 70 parts per trillion (ppt) F. The aqueous firefighting foam compositions of the present disclosure may include substantially less than 70 ppt F.

An exemplary embodiment provides an aqueous firefighting foam composition including a sugar component, which includes a monosaccharide sugar and/or sugar alcohol; a surfactant mixture containing a zwitterionic surfactant and one or more of an alkyl sulfate anionic surfactant, alkyl sulfonate anionic surfactant and an alkyl ether sulfate anionic surfactant; an organic solvent, such as a glycol, glycerol and/or glycol ether; and a polysaccharide thickener. An aqueous firefighting foam precursor can be formed by diluting the concentrated composition with a much larger volume of an aqueous diluent, e.g., municipal water and/or salt water. The resulting firefighting foam precursor can then be aerated to provide a firefighting foam.

In another exemplary embodiment, the aqueous firefighting foam composition includes a) a sugar component, which includes a monosaccharide sugar and/or sugar alcohol; b) an anionic surfactant, such as an alkyl sulfate, an alkyl sulfonate and/or an alkyl ether sulfate; c) a zwitterionic surfactant, such as an alkylamidopropyl hydroxysultaine surfactant, an alkylamidoalkyl betaine surfactant, an alkyl sulfobetaine surfactant, and/or an alkyl betaine surfactant, d) an organic solvent, which includes one or more of a glycol, glycerol, a glycol ether or a water-soluble polyethylene glycol, e) a polysaccharide thickener, such as xanthan and/or diutan gum; and f) at least about 40 wt. % water. The composition generally contains no more than 0.01 wt. % of the fluorinated surfactant and, often, is completely free of any fluorinated surfactant or other fluorinated compound.

Another exemplary embodiment provides an aqueous firefighting foam composition including a) at least about 10 wt. % of a sugar component, which comprises at least about 50 wt. %, or at least about 75 wt. % monosaccharide sugar, e.g., glucose and/or fructose; b) polysaccharide thickener; c) a surfactant component, which comprises anionic surfactant and zwitterionic surfactant; d) organic solvent comprising one or more of a glycol, glycol ether, glycerol and/or water-soluble polyethylene glycol (PEG); and e) at least about 40 wt. % water. Such a composition does not contain any amine oxide or nonionic surfactants and is substantially free of fluorinated compounds.

Another exemplary embodiment provides an aqueous firefighting foam composition including a) a sugar component, which includes a monosaccharide sugar and/or sugar alcohol; b) an octyl sulfate salt and/or decyl sulfate salt and/or lauryl sulfate salt, c) an alkyl hydroxysultaine surfactant and/or alkylamidoalkyl hydroxysultaine surfactant, d) a polysaccharide thickener comprising a natural gum, such as xanthan gum, diutan gum or a derivative thereof, e) a solvent mixture including ethylene glycol, butyl carbitol and, optionally, glycerine; f) at least about 40 wt. % water. The composition generally contains no more than 0.01 wt. % fluorinated surfactant and, often, is completely free of any fluorinated surfactant or other fluorinated compound. Such a composition may not contain any amine oxide or nonionic surfactants.

Another exemplary embodiment provides an aqueous firefighting foam composition including a) a sugar component, which comprises monosaccharide sugar (e.g., glucose and/or fructose) and/or sugar alcohol (e.g., sorbitol, mannitol and/or xylitol); b) a polysaccharide thickener, such as diutan gum and/or xanthan gum; c) a $C_8$-$C_{14}$ alkyl sulfate anionic surfactant; d) $C_8$-$C_{14}$ alkylamidopropyl hydroxysultaine surfactant; e) a solvent mixture including ethylene glycol and butyl carbitol; and f) at least about 40 wt. % water. The composition generally contains no more than 0.1 wt. % fluorinated surfactant and, often, is completely free of any fluorinated surfactant or other fluorinated compound. Such a composition typically does not contain any amine oxide or nonionic surfactants.

Another exemplary embodiment provides an aqueous firefighting foam composition including a) a sugar component including one or more monosaccharide sugars and/or sugar alcohols, b) anionic surfactant, c) zwitterionic surfactant, d) a polysaccharide thickener, e) organic solvent that includes glycol ether having at least 8 carbon atoms and/or an alkylene glycol having at least 5 carbon atoms, f) at least about 30 wt. %, more often at least about 50 wt. % water. Such compositions may include about 5 to 40 wt. % and more typically about 10 to 20 wt. % of the sugar component. The sugar component may contain at least about 75 wt. %, or at least about 85 wt. % monosaccharide sugars. In some instances, the aqueous firefighting foam composition does not include any butyl carbitol. In some instances, the organic solvent includes one or more of 1,6-hexanediol, hexylene glycol, 1,12-dodecanediol, ethyleneglycol monophenyl ether, butyl carbitol and dipropylene glycol monobutyl ether. Such a composition typically does not contain any amine oxide or nonionic surfactants.

Another exemplary embodiment provides an fluorine-free aqueous firefighting foam concentrate including a) a sugar component including one or more monosaccharide sugars and/or sugar alcohols, b) a surfactant system including at least one anionic surfactant and a zwitterionic surfactant, c) a polysaccharide thickener, d) organic solvent system including at least one organic solvent selected from a glycol ether, a glycol and a polyol, e) at least about 30 wt. %, more often at least about 40 wt. %, or at least about 50 wt. % water. Such concentrates may include about 10 to 25 wt. % and more typically about 10 to 20 wt. % of the sugar component. The sugar component may include at least about 75 wt. % monosaccharide sugar, e.g., glucose and/or fructose. In some instances, the fluorine-free aqueous firefighting foam concentrate also includes at least one of a divalent metal salt, a preservative, and an antimicrobial agent. Such a concentrate typically does not contain any amine oxide or nonionic surfactants.

Another exemplary embodiment provides a fluorine-free aqueous fire-fighting composition, which includes about 15 to 20 wt. % of a sugar component, which contains at least about 85 wt. % monosaccharide sugar; about 5 to 10 wt. % $C_8$-$C_{14}$ alkyl sulfate anionic surfactant; about 2 to 7 wt. % cocamidopropyl hydroxysultaine; about 5 to 10 wt. % of a water-miscible solvent mixture comprising butyl carbitol, ethylene glycol and glycerine (e.g., such that the composition contains about 4 to 6 wt. % butyl carbitol, about 1 to 3 wt. % ethylene glycol and about 0.1 to 1 wt. % glycerine); triethanolamine; about 0.5 to 3 wt. % polysaccharide thickener comprising xanthan gum and diutan gum; magnesium salt; and at least about 50 wt. % water. The sugar component may include at least about 85 wt. % of a mixture of glucose and fructose. The $C_8$-$C_{14}$ alkyl sulfate anionic surfactant may include a mixture of an octyl sulfate salt, a decyl sulfate salt and a lauryl sulfate salt. Such a composition does not contain any amine oxide or nonionic surfactant and is substantially free of fluorinated compounds.

DETAILED DESCRIPTION

In one aspect, the aqueous firefighting foam compositions of the present disclosure include a sugar component, which includes a monosaccharide sugar and/or sugar alcohol; polysaccharide thickener; a surfactant component, which comprises anionic surfactant and/or zwitterionic surfactant; and water-miscible organic solvent. Such compositions generally are substantially free of fluorinated compounds, e.g., contain no more than 0.1 wt. % fluorinated surfactant and, often, are completely free of any fluorinated surfactant or other fluorinated compound. Such a composition typically does not contain any amine oxide or nonionic surfactants.

Sugars and/or sugar alcohols suitable for use in the present aqueous fire-fighting foam compositions are generally simple monosaccharide sugars or related sugar alcohols, but may include small amounts of other carbohydrates, such as common sugar (sucrose/dextrose) derived from sugar cane or sugar beets. Sucrose is a disaccharide composed from the basic, simple sugar molecules glucose and fructose. Mixtures where the majority of the sucrose has been broken down into its monosaccharide components, glucose and fructose (e.g., invert sugar), are quite suitable for use in the present compositions. The sugar component may contain at least about 75 wt. %, or at least 85 wt. % monosaccharide sugars and/or sugar alcohols. Often, the sugar component suitably contains at least about 75 wt. %, or at least about 85 wt. % monosaccharide sugars, such as glucose and/or fructose. The sugar component typically contains a total of no more than about 10 wt. % and, often no more than about 5 wt. % disaccharide sugars and oligosaccharides (as a percentage of the total weight of the sugar component).

Sucrose is readily available in view of its world production from sugar cane and sugar beets on the order of millions of tons per annum. Those skilled in the art will also understand that other commercially available simple monosaccharides and related sugar alcohols can be utilized in the present foam compositions. Examples of suitable monosaccharides for use in the present foam compositions include one or more of glucose, fructose, mannose, xylose and galactose. Examples of suitable sugar alcohols for use in the present foam compositions include one or more of a four carbon sugar alcohol, such as erythritol, a five carbon alditol, such as xylitol, a six carbon alditol, such as mannitol and/or sorbitol, and other sugar alcohols, such as isomalt. The sugar alcohol may be one derived from a monosaccharide.

The present aqueous fire-fighting foam compositions generally include a sugar component including at least about 50 wt. %, at least about 75 wt. % and, in many instances at least about 85 wt. % of one or more monosaccharide sugars and/or sugar alcohols. Suitable examples include such a sugar component containing one or more of glucose, fructose, mannose, xylose, sorbitol, xylitol and mannitol. The foam composition may include about 5 to 25 wt. %, or about 5 to 20 wt. % of the sugar component. In some instances, the foam composition may include about 10 wt. % to 15 wt. % of the sugar component. In some embodiments, the sugar component comprises at least about 75 wt. %, at least about 80 wt. %, or even at least about 90 wt. % monosaccharide sugar and/or sugar alcohol. For example, the sugar component may comprise at least about 75 wt. %, at least about 80 wt. %, at least about 85 wt. %, or even at least about 90 wt. % of one or more of glucose, fructose, mannose, xylitol, sorbitol, and mannitol. In some embodiments, the foam composition may include a sugar component, which comprises at least about 75 wt. % of one or more sugar alcohols, such as xylitol, sorbitol and mannitol. The sugar component may include at least about 75 wt. %, at least about 80 wt. %, at least about 85 wt. %, or even at least about 90 wt. % of one or more of glucose, fructose, and sorbitol. For example, the sugar component may include at least about 75 wt. %, or at least about 85 wt. % glucose and/or fructose.

The present aqueous fire-fighting foam compositions typically include an anionic surfactant. The anionic surfactant may suitably include an aliphatic sulfate surfactant, an aliphatic sulfonate surfactant, aliphatic ether sulfate surfactant and/or an aliphatic ether sulfonate surfactant. The anionic surfactant may suitably include an alkyl sulfate surfactant, an alkyl sulfonate surfactant, alkyl ether sulfate surfactant and/or an alkyl ether sulfonate surfactant. The anionic surfactant typically includes an alkyl sulfate surfactant and/or an alkyl sulfonate surfactant. The alkyl sulfate salt surfactant typically includes include a $C_{8-12}$-alkyl sulfate salt. Suitable examples of the $C_{8-12}$-alkyl sulfate salt include a dodecyl sulfate salt (lauryl sulfate salt), a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, triethanolamine lauryl sulfate salt or a combination thereof. In embodiments that include the anionic surfactant, the aqueous firefighting foam composition may include about 1 to 25 wt. % or about 2 to 20 wt. % of the anionic surfactant. Typically, the aqueous firefighting foam composition may include about 3 to 15 wt. %, about 5 to 12 wt. % and, in some instances, about 5 to 10 wt. % of a the anionic surfactant.

In some embodiments, the aqueous fire-fighting foam composition may include an anionic surfactant comprises a $C_{8-14}$-alkyl sulfate salt and/or a $C_{8-14}$-alkyl sulfonate salt. In some embodiments, the aqueous fire-fighting foam composition may include an anionic surfactant, which comprises one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts and tetradecyl sulfate salts may be suitable for use as anionic surfactants in the present foam composition. The anionic surfactant may suitably be a sodium, potassium, and/or ammonium salt (e.g., an $NH_4$+ or trialkyl ammonium salt).

In some embodiments, the aqueous fire-fighting foam composition may include an anionic surfactant comprising a $C_{8-14}$-alkyl sulfate amine salt. In some embodiments, the aqueous fire-fighting foam composition may include an anionic surfactant, which comprises one or more surfactants selected from $C_{8-12}$-alkyl sulfate amine salts and/or a $C_{8-12}$-alkyl sulfonate amine salts. For example, one or more of triethanolamine octyl sulfate salts, triethanolamine decyl sulfate salts, triethanolamine dodecyl sulfate salts and triethanolamine tetradecyl sulfate salts may be suitable for use as anionic surfactants in the present fire-fighting foam composition.

The present aqueous fire-fighting foam compositions typically include a zwitterionic surfactant. The zwitterionic surfactant typically includes one or more of an aliphatic amidoalkyl betaine surfactant, an aliphatic betaine surfactant, an aliphatic sulfobetaine surfactant and an aliphatic amidoalkylene hydroxysultaine surfactant, such as an aliphatic amidopropyl hydroxysultaine surfactant. The zwitterionic surfactant may include one or more of an alkylamidoalkyl betaine surfactant, an alkyl betaine surfactant, an alkyl sulfobetaine surfactant and an alkylamidoalkylene hydroxysultaine surfactant, such as an alkylamidopropyl hydroxysultaine surfactant. For example, the foam composition may include a zwitterionic surfactant, which comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{848}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam composition may include about 1 to 15 wt. % and often about 1 to 12 wt. % of the zwitterionic surfactant. In certain embodiments, the aqueous firefighting foam composition may include about 1 to 10 wt. %, or about 2 to 7 wt. % of the zwitterionic surfactant.

The present aqueous fire-fighting foam compositions do not include nonionic surfactants or are substantially free of nonionic surfactant. Substantially free in this context means that the aqueous fire-fighting foam compositions include no more than 0.1 wt. % nonionic surfactant. In some instances, the aqueous fire-fighting foam compositions include no more than 0.01 wt. % nonionic surfactant.

The present aqueous fire-fighting foam compositions typically include a water-miscible solvent, which may suitably include one or more of a glycol, a glycol ether, glycerol, and a water-soluble polyethylene glycol. Examples of suitable organic solvents include diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. The organic solvent may include a mixture of glycerol (glycerine), an alkylene glycol, and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., diethylene glycol monoalkyl ether (e.g., butyl carbitol). In some embodiments, the organic solvent includes an alkylene glycol, such as ethylene glycol, propylene glycol, dipropylene glycol and/or diethylene glycol. In some embodiments, the organic solvent includes a polyol, such as glycerine. The organic solvent may include a mixture of butyl carbitol, a glycol ether, such as ethylene glycol and/or propylene glycol, and glycerine. For example, the organic solvent can include glycerine, ethylene glycol, and butyl carbitol. In another suitable example, the organic solvent includes glycerine, propylene glycol, and butyl carbitol.

In some instances, the organic solvent in the present compositions may include one or more glycol ethers having at least 8 carbon atoms and/or alkylene glycols having at least 5 carbon atoms (e.g., having about 5 to 12 carbon atoms). Examples of such alkylene glycols include 1,5-pentanediol, 1,6-hexanediol, hexylene glycol, 1,7-heptanediol, 1,8-octanediol, 1,9-nonanediol, 1,10-decanediol and 1,12-dodecanediol. Examples of suitable glycol ethers include ethyleneglycol monophenyl ether, diethyleneglycol monobutyl ether ("butyl carbitol"), ethyleneglycol monohexyl ether, dipropyleneglycol monopropyl ether and dipropylene glycol monobutyl ether. For example, the organic solvent may include one or more of 1,6-hexanediol, hexylene glycol, ethyleneglycol monophenyl ether, butyl carbitol, 1,12-dodecanediol and dipropylene glycol monobutyl ether. For example, the organic solvent may include a combination of 1,6-hexanediol and dipropylene glycol monobutyl ether. In another suitable example, the organic solvent may include a combination of 1,6-hexanediol, ethyleneglycol, butyl carbitol and dipropylene glycol monobutyl ether. In another suitable example, the organic solvent may include a combination of 1,6-hexanediol, dipropylene glycol monobutyl ether and ethyleneglycol monophenyl ether. In another suitable example, the organic solvent may include a combination of 1,6-hexanediol, 1,12-dodecanediol, ethyleneglycol monophenyl ether and dipropylene glycol monobutyl ether. In another suitable example, the organic solvent may include a combination of 1,12-dodecanediol, ethyleneglycol monophenyl ether and dipropylene glycol monobutyl ether. In another suitable example, the organic solvent may include a combination of 1,6-hexanediol, 1,12-dodecanediol and ethyleneglycol monophenyl ether.

The foam composition may suitably include about 1 to 50 wt. %, about 1 to 25 wt. %, about 1 to 20 wt. %, about 2 to 15 wt. %, or about 5 to 10 wt. % organic solvent. In many embodiments, the aqueous firefighting foam composition includes an organic solvent including one or more of an alkylene glycol, glycerine, and a glycol ether. The alkylene glycol may include 1,6-hexanediol, 1,12-dodecanediol, propylene glycol and/or ethylene glycol. The glycol ether typically includes ethylene glycol monoalkyl ether, diethylene glycol monoalkyl ether, dipropylene glycol monoalkyl ether, triethylene glycol monoalkyl ether, ethyleneglycol monophenyl ether and 1-butoxyethoxy-2-propanol. In some embodiments, the organic solvent may be a mixture of glycerine, alkylene glycol and glycol ether. In some embodiments, the organic solvent may be a mixture of glycerine, propylene glycol and alkyl carbitol. In some embodiments, the organic solvent may be a mixture of glycerine, ethylene glycol and alkyl carbitol. In such embodiments, the organic solvent may include the alkylene glycol and alkyl carbitol in a weight ratio of about 0.1:1 to 10:1 or about 0.2:1 to 5:1. In some embodiments, the organic solvent may be a mixture of glycerine, ethylene glycol, and butyl carbitol. In some embodiments, the organic solvent may include about 1 to 15 wt. % and often about 1 to 10 wt. % alkylene glycol, such as ethylene glycol, with about 1 to 15 wt. % and often about 1 to 10 wt. % of a glycol ether, such as butyl carbitol, together with about 0.1 to 5 wt. % or about 0.1 to 2 wt. % glycerol.

The aqueous firefighting foam composition includes a thickener, such as a polysaccharide thickener. The polysaccharide thickener may include a polysaccharide that is soluble in the aqueous firefighting foam concentrate and a second polysaccharide that is less soluble or insoluble in the aqueous firefighting foam concentrate. In some embodiments, the second polysaccharide may be insoluble (and dispersed) in the aqueous firefighting concentrate but may be soluble in water alone or in solutions where the concentrate has been diluted with a much larger volume of water. In other embodiments, the concentrate may only include one or more polysaccharides that are completely soluble in the concentrate. The foam concentrate typically includes about 0.1 to 5 wt. %, about 0.2 to 4 wt. %, about 0.3 to 3 wt. %, or about 0.5 to 3 wt. % of the polysaccharide thickener.

Examples of suitable polysaccharide thickeners which may be used in the present foam compositions include agar, sodium alginate, carrageenan, gum arabic, gum guaicum, neem gum, *pistacia lentiscus*, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, *cassia* gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include one or more of xanthan gum, diutan gum, rhamsan gum, welan, gellan gum, guar gum, konjac gum, tarn gum, and methylcellulose. In some embodiments, a mixture of xanthan gum and one or more of diutan gum, rhamsan gum, welan, gellan gum, guar gum, konjac gum, tarn gum, and methylcellulose may be included in the composition. In other embodiments, the foam concentrate may include a mixture of xanthan gum and one or more of diutan gum, rhamsan gum, welan gum and gellan gum as the polysaccharide thickener. In other embodiments, the foam concentrate may include a mixture of xanthan gum and diutan gum and/or rhamsan gum. In other embodiments, the foam concentrate may include a mixture of xanthan gum and diutan gum. In other embodiments, the foam concentrate may include a mixture of xanthan gum and konjac gum.

Polysaccharide thickeners, which include a combination of xanthan gum and diutan gum, may be particularly suitable for use in the present foam compositions. For examples, the foam composition may include about 0.2 to 3 wt. %, about 0.3 to 2 wt. %, about 0.5 to 1.5 wt. % and even, about 0.5 to 1 wt. % xanthan gum. Such foam compositions may also include about 0.1 to 2 wt. %, about 0.2 to 1.5 wt. %, or even, about 0.2 to 1 wt. % diutan gum.

In many instances, the present aqueous firefighting foam composition may include an alkanolamine, which can act as a pH adjusting agent and/or buffer. Suitable alkanolamines comprise monoethanolamine, diethanolamine, diisopropanolamine and/or triethanolamine. The present compositions may include triethanolamine. The triethanolamine may be present in only a relatively small amount, e.g., about 0.1 to 0.3 wt. % when included primarily as a pH adjusting agent. In other instances, the alkanolamine may be present in a higher amount, whether introduced per se as an ingredient and/or in the form of a cation as part of one of the surfactants present in the composition. In such instances, an alkanolamine such as triethanolamine, may suitably be present as about 0.1 to 5 wt. %, about 0.3 to 5 wt. %, about 0.5 to 3 wt. % and in some instances, about 0.5 to 2 wt. % of the composition.

As discussed above, the aqueous firefighting foam composition includes water. In some embodiments, the water is water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, often at least about 40 wt. % water, or at least about 50 wt. % water. In some embodiments, the aqueous firefighting foam composition includes greater than about 60 wt. % water. In some embodiments, the aqueous firefighting foam composition may be produced using a source of water that has a total concentration of fluorine atoms on a weight percentage basis of no more than about 1 ppm F.

The aqueous firefighting foam compositions of the present disclosure are may be substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. The aqueous firefighting foam compositions of the present disclosure are substantially free of fluorine. As used herein, the phrase "substantially free of fluorine" means that the composition has a total concentration of fluorine atoms on a weight percentage basis of no more than about 1 part per million (ppm) F. The aqueous firefighting foam compositions of the present disclosure may include substantially less than 1 ppm F.

In some embodiments, the aqueous firefighting foam composition includes one or more chelators or sequestering buffers. Exemplary and non-limiting chelators and sequestering buffers include agents that sequester and chelate metal ions, including polyamminopolycarboxylic acids, ethylenediaminetetraacetic acid, citric acid, tartaric acid, nitrilotriacetic acid, hydroxyethylethylenediaminetriacetic acid and salts thereof. Exemplary buffers include Sorensen's phosphate or McIlvaine's citrate buffers.

In some embodiments, the aqueous firefighting foam composition includes one or more corrosion inhibitors. Exemplary and non-limiting corrosion inhibitors includes ortho-phenylphenol, tolyltriazole, and phosphate ester acids. In some embodiments, the corrosion inhibitor is tolyltriazole.

In some embodiments, the aqueous firefighting foam concentrate may also include a metallic salt, typically a metallic salt which includes a multi-valent cation. For example, suitable salts may include a cation selected from the group consisting of aluminum, calcium, copper, iron, magnesium, potassium, and calcium cations. The counteranion may suitably be a sulfate and/or phosphate anion. In one embodiment, the metallic salt may include a divalent salt, e.g., a magnesium salt such as magnesium sulfate. When included, a divalent salt, such as magnesium sulfate, may suitably be present as about 0.1 to 5 wt. %, about 0.3 to 5 wt. %, about 0.5 to 4 wt. % and in some instances, about 1 to 3 wt. % of the composition.

In some embodiments, the aqueous firefighting foam concentration may include a reducing agent. Accordingly, an aqueous fire-fighting foam concentrate may include a sugar component, an anionic surfactant, a zwitterionic surfactant, an organic solvent comprising glycol ether and/or glycol solvent, a polysaccharide thickener; and a reducing agent. When present, the reducing agent may be present in the foam concentration from about 0.01 wt % to about 5 wt %. This may include from about 0.01 wt % to about 3 wt %, from about 0.05 wt % to about 5 wt %, from about 1 wt % to about 5 wt %, or from about 1 wt % to about 3 wt %.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam concentrate may also include a preservative, such as one or more antimicrobial compounds and/or biocidal compounds. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), Dowicil 75 and Dowacide A (Dow Chemical Company). In some instances, the biocidal agent in the present composition may include a phenol-based biocide, such as Dowacide A (sodium o-phenylphenate).

Tables 1 to 4 below provide an illustration of suitable formulations of the present firefighting foam compositions designed to be combined with a diluent, then aerated and administered to fight a fire in the form of a firefighting foam.

TABLE 1

| Ingredient | Amount (wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum | 0.1-5 |
| Water-miscible organic solvent | 1-20 |
| Monosaccharide sugar(s) and/or sugar alcohol(s) | 5-30 |
| Alkanolamine | 0-5 |

TABLE 2

| Ingredient | Amount (wt. %) |
|---|---|
| Biocide | 0-0.2 |
| Corrosion Inhibitor | 0-0.2 |
| Water | 40-75 |
| Hydroxysultaine Zwitterionic Surfactant | 1-10 |
| Alkyl Sulfate Anionic Surfactant | 5-15 |
| Polysaccharide Gum | 0.2-3 |
| Glycol Ether Solvent | 2-15 |
| Polyol Solvent | 2-10 |
| Monosaccharide sugar(s) and/or sugar alcohol(s) | 5-25 |
| Alkanolamine | 0.1-5 |

TABLE 3

| Ingredient | Amount (wt. %) |
|---|---|
| Biocide | 0-0.2 |
| Corrosion inhibitor | 0-0.2 |
| Water | 50-75 |
| $C_{8-14}$-alkyl amidopropyl hydroxysultaine | 1-10 |
| $C_{8-14}$-Alkyl sulfate surfactant | 5-10 |
| xanthan & diutan gum | 0.5-3 |
| Alkylene glycol | 1-5 |
| Glycol ether | 2-10 |
| Glycerine | 0-2 |
| Alkanolamine | 0.5-5 |
| Monosaccharide sugar(s) | 10-20 |

TABLE 4

| Ingredient | Amount (wt. %) |
|---|---|
| Biocide | 0-0.2 |
| Corrosion Inhibitor | 0-0.2 |
| Water | 55-70 |
| Cocamidopropyl hydroxysultaine | 2-7 |
| Octyl/Decyl/Lauryl Sulfate | 5-10 |
| Diutan Gum | 0.1-2 |
| Xanthan Gum | 0.2-2 |
| Glycerine | 0-2 |
| Ethylene Glycol | 1-5 |
| Butyl Carbitol | 2-7 |

TABLE 4-continued

| Ingredient | Amount (wt. %) |
|---|---|
| Triethanolamine | 0.5-3 |
| Glucose and/or fructose | 5-20 |

EXAMPLES

The following examples more specifically illustrate formulations for preparing aqueous firefighting compositions according to various embodiments described above. These examples should in no way be construed as limiting the scope of the present technology.

Tables 5, 6, and 7 below show the composition of a number of exemplary formulations of the present aqueous firefighting foam composition. The amounts shown in these tables represent the weight percentage of the particular component based on the total weight of the composition. The formulations include a) a surfactant mixture including an anionic surfactant and a zwitterionic surfactant, b) organic solvent comprising one or more of an alkylene glycol, glycerol, and a glycol ether, d) a substantial amount of water; e) a polysaccharide thickener. These exemplary formulations typically also include a divalent metal, such as a magnesium salt (e.g., magnesium sulfate). These exemplary formulations may also include a preservative, an antimicrobial and/or a corrosion inhibitor, though these ingredients are considered optional and are not key to the composition functioning as a fire-fighting agent.

TABLE 5

| Component | Ex. 1 | Ex. 2 | Ex. 3 | Ex. 4 | Ex. 5 | Ex. 6 | Ex. 7 | Ex. 8 |
|---|---|---|---|---|---|---|---|---|
| Cocamidopropyl Hydroxysultaine | 4.0 | 4.0 | 4.0 | 4.0 | 4.0 | 4.0 | 4.0 | 4.0 |
| Na Octyl Sulfate | 3.2 | 3.2 | 3.2 | 3.2 | 3.2 | 3.2 | 3.2 | 3.2 |
| TEA Lauryl Sulfate | 3.2 | 3.2 | 3.2 | 3.2 | 3.2 | 3.2 | 3.2 | 3.2 |
| Decyl Sulfate | 1.6 | 1.6 | — | — | — | — | — | 1.2-3.2 |
| TEA* | ~1.1 | ~1.1 | ~1.2 | ~1.2 | ~1.2 | ~1.2 | ~1.2 | ~1.1-1.3 |
| Ethylene glycol monophenyl ether | — | — | — | — | — | 4.0 | 2.0 | — |
| Glycol Ether DPnB | — | — | — | 5.0 | 2.0 | — | 2.0 | — |
| Butyl Carbitol | 5.0 | 5.0 | — | — | 1.0 | — | — | 5-7 |
| 1,6-Hexanediol | — | — | 5.0 | 1.0 | 1.0 | 1.0 | 1.0 | — |
| Ethylene glycol | 2.0 | 5.0 | — | — | 1.0 | — | — | 2-5 |
| Glycerine | ~0.4 | ~0.4 | ~0.4 | ~0.4 | ~0.4 | ~0.4 | ~0.4 | ~0.4 |
| Glucose/fructose | ~13.5 | ~13.5 | ~13.5 | ~13.5 | ~13.5 | ~13.5 | ~13.5 | ~13.5-17 |
| Xanthan/Diutan | 1.5 | 1.5 | 1.5 | 1.5 | 1.5 | 1.5 | 1.5 | 1.5 |
| Mg Sulfate | 2.0 | 2.0 | 2.0 | 2.0 | 2.0 | 2.0 | 2.0 | 2-2.5 |
| Preservative | 0.1 | 0.1 | 0.1 | 0.1 | 0.1 | 0.1 | 0.1 | 0.1 |
| Tolyltriazole | 0.05 | 0.05 | 0.05 | 0.05 | 0.05 | 0.05 | 0.05 | 0.05 |
| Water | ~64 | ~61 | ~66 | ~65 | ~66 | ~66 | ~66 | ~59-61 |

TABLE 6

| Component | Ex. 9 | Ex. 10 | Ex. 11 | Ex. 12 | Ex. 13 |
|---|---|---|---|---|---|
| Cocamidopropyl Hydroxy sultaine | 4.0 | 4.0 | 4.0 | 4.0 | 4.0 |
| Na Octyl Sulfate | 3.2 | 3.2 | 3.2 | 3.2 | 3.2 |
| TEA Lauryl Sulfate | 3.2 | 3.2 | 3.2 | 3.2 | 3.2 |
| Decyl Sulfate | 1.6 | 1.6 | 1.2 | 1.6 | 1.2-1.6 |
| TEA | ~1.3 | ~1.3 | ~1.1 | ~1.3 | ~1.1-1.3 |
| Butyl Carbitol | 5 | 7 | 5 | 5 | 5 |
| Ethylene glycol | 5 | 3 | 2 | 2 | 2 |
| Glycerine | ~0.4 | ~0.4 | ~0.4 | ~0.4 | ~0.4 |
| Glucose/fructose | ~13.5 | ~13.5 | ~17 | ~17 | ~17 |
| Xanthan/Diutan | 1.5 | 1.5 | 1.5 | 1.5 | 1.5 |
| Mg Sulfate | 2.0 | 2.0 | 2.5 | 2.5 | 2.5 |
| Preservative | 0.1 | 0.1 | 0.1 | 0.1 | 0.1 |

TABLE 6-continued

| Component | Ex. 9 | Ex. 10 | Ex. 11 | Ex. 12 | Ex. 13 |
|---|---|---|---|---|---|
| Tolyltriazole | 0.05 | 0.05 | 0.05 | 0.05 | 0.05 |
| Water | ~61 | ~61 | ~61 | ~59 | ~59-61 |

TABLE 7

| Component | Ex. 14 | Ex. 15 | Ex. 16 | Ex. 17 | Ex. 18 |
|---|---|---|---|---|---|
| Cocamidopropyl Hydroxysultaine | 4.0 | 4.0 | 4.0 | 4.0 | 4.0 |
| Na Octyl Sulfate | 3.2 | 3.2 | 3.2 | 3.2 | 3.2 |
| TEA Lauryl Sulfate | 3.2 | 3.2 | 3.2 | 3.2 | 3.2 |
| TEA* | ~1.2 | ~1.2 | ~1.2 | ~1.2 | ~1.2 |
| Ethylene glycol monophenyl ether | 2.5 | 4.0 | 3.5 | 3.0 | 3.0 |
| Glycol Ether DPnB | 1.5 | — | 0.5 | 1.0 | 1.0 |
| 1,6-Hexanediol | 0.5 | 0.5 | 0.85 | 0.75 | — |
| 1,12-Dodecanediol | 0.5 | 0.5 | 0.15 | 0.25 | 1.0 |
| Glycerine | ~0.4 | ~0.4 | ~0.4 | ~0.4 | ~0.4 |
| Glucose/fructose | ~13.5 | ~13.5 | ~13.5 | ~13.5 | ~13.5 |
| Xanthan/Diutan | 1.5 | 1.5 | 1.5 | 1.5 | 1.5 |
| Mg Sulfate | 2.0 | 2.0 | 2.0 | 2.0 | 2.0 |
| Preservative | 0.1 | 0.1 | 0.1 | 0.1 | 0.1 |
| Tolyltriazole | 0.05 | 0.05 | 0.05 | 0.05 | 0.05 |
| Water | ~66 | ~66 | ~66 | ~66 | ~66 |

The present exemplary aqueous firefighting foam compositions, including the aqueous firefighting foam formulations shown in Tables 1-7, typically have a pH of about 7 to 9. The formulations shown in Tables 1-7 may have a pH of about 7.5 to 8.5. If necessary, a pH-adjusting agent may be added to the composition to achieve the desired pH range.

The present exemplary aqueous firefighting foam compositions, including the exemplary aqueous firefighting foam formulations shown in Tables 1-7, may have a viscosity of about 1,000 to 10,000 cps, in some instances about 1,000 to 5,000 cps and, in some embodiments, may have a viscosity of about 1,000 to 2,500 cps (as determined at room temperature (75° F./24° C.) with a #4 spindle at 30 rpm).

Method of Producing a Firefighting Foam

The firefighting foam concentrates described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Exemplary diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation may impact the actual firefighting performance as seen in the UL and EN fire tests. It may be suitable to begin by mixing the sugar component with a substantial amount of water and subsequently preparing a solution or slurry of the polysaccharide thickener in the aqueous sugar solution prior to blending in the remaining components of the foam concentrate. It was found that first preparing an aqueous sugar solution by combining and mixing the sugars (e.g., glucose, fructose, and/or sorbitol) with water may facilitate later dissolution and/or dispersal of the biogums/biopolymers (e.g., xanthan gum). This can allow the gums to properly hydrate without encapsulating (clumping) upon the addition of the surfactant(s), other optional compounds and remaining amounts of water. Surfactants and other optional compounds can then be added and the resulting mixture may finally be diluted further with water to decrease the viscosity of the preparation, if desired.

Firefighting foams that were prepared not following this order of component addition may result in polysaccharide bio gums that are encapsulated, but not fully hydrated, which can result in the production of foams that are not satisfactory for fire testing. Thus, in some embodiments, the initial formation of an aqueous sugar solution is important in process order and can be used to dissolve/disperse polysaccharide thickener(s) into the foam concentrate before addition of any other ingredients, such as surfactant(s) and/or other compounds.

Method of Fighting a Fire

The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an exemplary embodiment, the aqueous firefighting foam composition includes a sugar component, which comprises monosaccharide sugar and/or sugar alcohol; anionic surfactant; zwitterionic surfactant; organic solvent comprising glycol ether and/or glycol solvent; and polysaccharide thickener. The composition typically includes at least about 40 wt. % water. The surfactant component does not contain any amine oxide or nonionic surfactant. In many instances, the composition comprises at least about 10 wt. %, or about 10-25 wt. % of the sugar component. Quite often, the sugar component includes at least about 75 wt. % and, often, at least about 85 wt. % monosaccharide sugar and/or sugar alcohol. For example, the sugar component may include at least about 75 wt. % of one or more of glucose, fructose, mannose, xylose, xylitol, sorbitol and mannitol. Typically, the composition is substantially free of fluorinated compounds.

In another exemplary embodiment, the aqueous firefighting foam composition includes about 10 to 25 wt. % of a sugar component, which comprises at least about 75 wt. % monosaccharide sugar and/or sugar alcohol; about 5 to 15 wt. % anionic surfactant; about 2 to 5 wt. % zwitterionic surfactant; about 0.1 to 5 wt. % polysaccharide thickener; about 1 to 20 wt. % organic solvent; and at least about 40 wt. % water. The surfactant component does not contain any amine oxide or nonionic surfactant. The anionic surfactant may include one or more of an aliphatic sulfate salt, aliphatic sulfonate salt, an aliphatic ether sulfate salt, and aliphatic ether sulfate salt. The zwitterionic surfactant may include one or more of an alkylamidoalkyl betaine, an alkyl sulfobetaine, an alkylamidoalkyl hydroxysultaine and an alkyl hydroxysultaine. The organic solvent may include one or more of a glycol, glycol ether, glycerol, and water-soluble polyethylene glycol (PEG). The composition is typically substantially free of fluorinated compounds. The composition generally contains no more than 0.01 wt. % of a fluorinated compound.

In another exemplary embodiment, the aqueous firefighting foam composition includes about 10 to 25 wt. % of monosaccharide sugars and/or sugar alcohols; about 5 to 10 wt. % anionic surfactant, which comprises one or more of an aliphatic sulfate salt, aliphatic sulfonate salt, an aliphatic ether sulfate salt, and aliphatic ether sulfate salt; about 1 to 10 wt. % zwitterionic surfactant, which comprises one or more of an alkylamidoalkyl betaine, an alkyl sulfobetaine, an alkylamidoalkyl hydroxysultaine and an alkyl hydroxysultaine; about 0.1 to 5 wt. % polysaccharide thickener; about 3 to 15 wt. % organic solvent, which comprises one or more of a glycol, glycol ether, glycerol and/or water-soluble polyethylene glycol (PEG); and at least about 40 wt. % water. The composition is typically substantially free of fluorinated compounds. The surfactant component does not contain any amine oxide or nonionic surfactant.

In another exemplary embodiment, the aqueous firefighting foam composition includes about 10 to 25 wt. % of a mixture of glucose and fructose; about 5 to 10 wt. % of a $C_8$-$C_{14}$alkyl sulfate anionic surfactant; about 1 to 10 wt. % of a $C_8$-$C_{14}$ alkylamidopropyl hydroxysultaine surfactant; about 3 to 15 wt. % of a mixture of ethylene glycol and butyl carbitol; about 0.5 to 3 wt. % diutan gum and xanthan gum; and at least about 40 wt. % water. The surfactant component does not contain any amine oxide or nonionic surfactant. Such a composition my contain no more than 0.01 wt. % fluorinated surfactants and is substantially free of nonionic surfactants.

In another exemplary embodiment, the aqueous firefighting foam composition includes at least about 10 wt. % of a sugar component, which comprises at least about 85 wt. % of one or more monosaccharide sugar and/or sugar alcohol; an anionic surfactant; a zwitterionic surfactant; an organic solvent comprising glycol ether having at least 8 carbon atoms and/or an alkylene glycol having at least 5 carbon atoms; a polysaccharide thickener; and at least about 50 wt. % water. The surfactant component does not contain any amine oxide or nonionic surfactant. Such a composition may contain no more than 0.01 wt. % fluorinated surfactants and is substantially free of nonionic surfactants. In such compositions, the organic solvent may include one or more of 1,6-hexanediol, hexylene glycol, 1,12-dodecanediol, ethyleneglycol monophenyl ether, butyl carbitol and dipropylene glycol monobutyl ether. In some instances, a composition may be provided where the organic solvent does not contain any butyl carbitol.

In another exemplary embodiment, the aqueous firefighting foam composition includes about 5 to 20 wt. % of a sugar component which comprises one or more monosaccharide sugars and/or sugar alcohols; about 5 to 15 wt. % of a surfactant system comprising an anionic surfactant and a zwitterionic surfactant; about 0.2 to 1.5 wt. % a polysaccharide thickener; about 1 to 5 wt. % of an organic solvent system comprising at least one organic solvent selected from a glycol ether, a glycol, a glycerol, and mixtures thereof; and at least about 50 wt. % water. Such compositions may contain contain no more than 0.01 wt. % fluorinated surfactants and are substantially free of nonionic surfactants. In some embodiments, the surfactant system may include cocamidopropyl hydroxysultaine and at least one of an octyl sulfate, a lauryl sulfate, and a decyl sulfate. In some embodiments, the surfactant system includes from about 3.8 to about 4.2 wt. % cocamidopropyl hydroxysultaine, from about 2.8 to about 3.5 wt. % sodium octyl sulfate, from about 2.8 to about 3.5 wt. % triethanolamine lauryl sulfate, and from about 1.0 to about 2.0 wt. % decyl sulfate. In some embodiments, the organic solvent system includes butyl carbitol, ethylene glycol, glycerine, or mixtures thereof. In some embodiments, the organic solvent system includes about 4 to 6 wt. % butyl carbitol, about 1 to 3 wt. % ethylene glycol, and about 0.1 to 1 wt. % glycerine. Some embodiments include a divalent metal salt, a preservative, or an antimicrobial agent. In some embodiments, the composition includes about 1 to 3 wt. % magnesium sulfate, about 0.05 to 0.2 wt. % preservative, and about 0.01 to 0.1 wt. % tolyltriazole.

In another exemplary embodiment, the aqueous firefighting foam composition includes about 10 to 20 wt. % of a sugar component which comprises one or more monosaccharide sugars and/or sugar alcohols; about 5 to 15 wt. % of a surfactant system comprising an anionic surfactant and a zwitterionic surfactant; about 0.2 to 1.0 wt. % a polysaccharide thickener; about 1 to 5 wt. % of an organic solvent system comprising at least one organic solvent selected from a glycol ether, a glycol, a glycerol, and mixtures thereof; and at least about 50 wt. % water. Such compositions may contain no more than 0.01 wt. % fluorinated surfactants and are substantially free of nonionic surfactants.

In another exemplary embodiment, the aqueous firefighting foam composition includes about 15 to 20 wt. % of a sugar component which comprises at least 85 wt. % of a monosaccharide sugars and/or sugar alcohols; about 5 to 10 wt. % of a $C_8$-$C_{14}$ alkyl sulfate anionic surfactant; about 2 to 7 wt. % cocamidopropyl hydroxysultaine; about 5 to 10 wt. % of an organic solvent system comprising at least one water-soluble organic solvent selected from butyl carbitol, ethylene glycol, glycerine, and mixtures thereof; about 0.5 to 3 wt. % polysaccharide thickener comprising xanthan gum and diutan gum; a divalent salt; and at least about 50 wt. % water. Such compositions may contain no more than 0.01 wt. % fluorinated surfactants and are substantially free of nonionic surfactants.

In the exemplary embodiments above including an organic solvent, it may be beneficial to include one or more of 1,6-hexanediol, hexylene glycol, ethyleneglycol monophenyl ether, butyl carbitol and dipropylene glycol monobutyl ether. Those exemplary embodiments including a polysaccharide thicker may benefit from including one or more of xanthan gum, diutan gum, rhamsan gum, welan, gellan gum, guar gum, konjac gum, tarn gum, and methylcellulose. Those exemplary embodiments including an anionic surfactant may benefit from including one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant.

In another exemplary embodiment, a firefighting foam may be created by mixing any of the preceding firefighting foam composition and a diluent. The aqueous diluent may be selected from the group consisting of fresh water, brackish water, sea water, and combinations thereof.

Another exemplary embodiment comprises a method of forming a firefighting foam in which the method includes the steps of mixing the firefighting foam composition of any of the preceding illustrative embodiments with an aqueous diluent to form a foam precursor solution, and aerating the foam precursor solution to form the firefighting foam. In such a method the aqueous diluent may be selected from the group consisting of fresh water, brackish water, sea water, and combinations thereof.

Another exemplary embodiment is a method of fighting a fire, where the method includes the steps of administering the firefighting foam described in the preceding exemplary embodiments to the fire.

In the exemplary embodiments described above, an aqueous firefighting foam composition may be provided that does not contain any protein hydrolysate. In some instances, an aqueous firefighting foam composition may be provided that does not contain any synthetic polymer or copolymer. In some instances, an aqueous firefighting foam composition may be provided that does not contain any non-biopolymeric thickening agent.

Para. 1. An aqueous fire-fighting composition comprising: a sugar component, which comprises monosaccharide sugar and/or sugar alcohol; anionic surfactant; zwitterionic surfactant; organic solvent comprising glycol ether and/or glycol solvent; polysaccharide thickener; and at least about 40 wt. % water; wherein the composition is substantially free of any amine oxide or nonionic surfactants; and the composition is substantially free of fluorinated compounds.

Para. 2. The aqueous fire-fighting composition of para. 1, wherein the composition comprises at least about 10 wt. %, or about 10-25 wt. % of the sugar component.

Para. 3. The aqueous fire-fighting composition of para. 1 or 2, wherein the sugar component comprises at least about 75 wt. % monosaccharide sugar and/or sugar alcohol. 4.

Para. 4. The aqueous fire-fighting composition of any one of paras. 1-3, wherein the sugar component comprises one or more of glucose, fructose, mannose, xylose, xylitol, sorbitol and mannitol.

Para. 5. The aqueous fire-fighting composition of any one of paras. 1-3, wherein the anionic surfactant comprises one or more of an aliphatic sulfate surfactant, an aliphatic sulfonate surfactant, an aliphatic succinate salt and an aliphatic ether sulfate surfactant.

Para. 6. The aqueous fire-fighting composition of any one of paras. 1-5, wherein the anionic surfactant comprises one or more of $C_8$-$C_{14}$ alkyl sulfate, a $C_8$-$C_{14}$ alkyl sulfonate and $C_{10}$-$C_{14}$ alkyl ether sulfate.

Para. 7. The aqueous fire-fighting composition of any one of paras. 1-6, wherein the anionic surfactant comprises one or more $C_8$-$C_{14}$ alkyl sulfate.

Para. 8. The aqueous fire-fighting composition of any one of paras. 1-7, wherein the anionic surfactant comprises one or more of octyl sulfate salt, decyl sulfate salt and lauryl sulfate salt.

Para. 9. The aqueous fire-fighting composition of any one of paras. 1-8, wherein the composition comprises about 2 to 20 wt. %, or about 5 to 15 wt. % of the anionic surfactant.

Para. 10. The aqueous fire-fighting composition of any one of paras. 1-9, wherein the zwitterionic surfactant comprises one or more of an aliphatic amidoalkyl betaine, an aliphatic sulfobetaine, an aliphatic amidoalkyl hydroxysultaine and an aliphatic hydroxysultaine.

Para. 11. The aqueous fire-fighting composition of any one of paras. 1-10, wherein the zwitterionic surfactant comprises one or more $C_8$-$C_{14}$ alkyl amidopropyl hydroxysultaine.

Para. 12. The aqueous fire-fighting composition of any one of paras. 1-11, wherein the zwitterionic surfactant comprises cocamidopropyl hydroxysultaine.

Para. 13. The aqueous fire-fighting composition of any one of paras. 1-12, wherein the composition comprises about 1 to 10 wt. %, or about 2 to 5 wt. % of the zwitterionic surfactant.

Para. 14. The aqueous fire-fighting composition of any one of paras. 1-13, wherein the organic solvent comprises a glycol ether having at least 8 carbon atoms and/or an alkylene glycol having at least 5 carbon atoms.

Para. 15. The aqueous fire-fighting composition of any one of paras. 1-14, wherein the organic solvent comprises one or more of diethylene glycol monobutyl ether, ethylene glycol monophenyl ether, dipropylene glycol monobutyl ether, dipropylene glycol monomethyl ether, 1,6-hexanediol, 1,12-dodecanediol, ethylene glycol, hexylene glycol, propylene glycol and glycerine.

Para. 16. The aqueous fire-fighting composition of any one of paras. 1-15, wherein the sugar component contains a total of no more than about 10 wt. % disaccharide sugars and oligosaccharides.

Para. 17. The aqueous fire-fighting composition of any one of paras. 1-16, wherein the polysaccharide thickener comprises one or more of xanthan gum, diutan gum, rhamsan gum, welan, gellan gum, guar gum, konjac gum, tarn gum, and methylcellulose.

Para. 18. The aqueous fire-fighting composition of any one of paras. 1-17, wherein the polysaccharide thickener comprises one or more of xanthan gum, diutan gum and rhamsan gum.

Para. 19. The aqueous fire-fighting composition of any one of paras. 1-18, wherein the zwitterionic surfactant comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant.

Para. 20. The aqueous fire-fighting composition of any one of paras. 1-19, wherein the zwitterionic surfactant comprises an alkylamidoalkyl hydroxysultaine.

Para. 21. The aqueous fire-fighting composition of any one of paras. 1-20, wherein the organic solvent comprises one or more of diethylene glycol monobutyl ether, dipropylene glycol monobutyl ether, ethylene glycol and glycerine.

Para. 22. The aqueous fire-fighting composition of any one of paras. 1-21, wherein the organic solvent comprises 1,6-hexanediol, 1,12-dodecanediol and/or dipropylene glycol monobutyl ether.

Para. 23. The aqueous fire-fighting composition of any one of paras. 1-22 further comprising a reducing agent.

Para. 24. The aqueous fire-fighting composition of para. 23, wherein the reducing agent comprises a sulfite salt.

Para. 25. The aqueous fire-fighting composition of para. 23 or 24, wherein the reducing agent comprises sodium sulfite, sodium metabisulfite, sodium bisulfite, or a mixture of any two or more thereof.

Para. 26. An aqueous fire-fighting composition comprising: at least about 10 wt. % monosaccharide sugar and/or sugar alcohol; $C_8$-$C_{14}$ alkyl sulfate anionic surfactant; $C_8$-$C_{14}$ alkylamidopropyl hydroxysultaine surfactant; organic solvent comprising a mixture of ethylene glycol and butyl carbitol; polysaccharide thickener comprising natural gum and/or a derivative thereof; and at least about 40 wt. % water; wherein the composition does not contain any amine oxide or nonionic surfactant; and the composition is substantially free of fluorinated compounds.

Para. 27. An aqueous fire-fighting composition comprising: about 10 to 25 wt. % of one or more monosaccharide sugars (glucose and fructose); about 5 to 10 wt. % $C_5$-$C_{14}$ alkyl sulfate anionic surfactant; about 1 to 10 wt. % $C_5$-$C_{14}$ alkylamidopropyl hydroxysultaine surfactant; about 3 to 15 wt. % of a mixture of ethylene glycol and butyl carbitol; about 0.5 to 3 wt. % diutan gum and xanthan gum; and at least about 40 wt. % water; wherein the composition does not contain any amine oxide or nonionic surfactant; and the composition is free of fluorinated compounds.

Para. 28. A fluorine-free aqueous fire-fighting composition comprising: at least about 10 wt. % a sugar component, which comprises one or more monosaccharide sugars and/or sugar alcohols; anionic surfactant; zwitterionic surfactant; organic solvent comprising glycol ether having at least 8 carbon atoms and/or an alkylene glycol having at least 5 carbon atoms; polysaccharide thickener; and at least about 50 wt. % water; wherein the composition is free of nonionic surfactant.

Para. 29. A fluorine-free aqueous fire-fighting composition comprising: at least about 15 wt. % of a sugar component, which comprises one or more monosaccharide sugars and/or sugar alcohols; at least about 10 wt. % of a surfactant system, which comprises at least one anionic surfactant and at least one zwitterionic surfactant; at least about 5 wt. % of an organic solvent system, which comprises at least one organic solvent selected from a glycol ether, a glycol, a glycerol, and mixtures thereof; at least about 0.5 wt. % of a polysaccharide thickener; and at least about 50 wt. % water; wherein the composition does not contain any amine oxide or nonionic surfactant and is free of fluorinated compounds.

Para. 30. The fluorine-free aqueous fire-fighting composition of para. 29, further comprising divalent metal salt, a preservative, or an antimicrobial agent.

Para. 31. The fluorine-free aqueous fire-fighting composition of para. 30, wherein the surfactant system comprises cocamidopropyl hydroxysultaine and at least one of an octyl sulfate, a lauryl sulfate, and a decyl sulfate.

Para. 32. The fluorine-free aqueous fire-fighting composition of para. 31 comprising from about 3.8 to about 4.2 wt. % cocamidopropyl hydroxysultaine, from about 2.8 to about 3.5 wt. % sodium octyl sulfate, from about 2.8 to about 3.5 wt. % triethanolamine lauryl sulfate, and from about 1.0 to about 2.0 wt. % decyl sulfate.

Para. 33. The fluorine-free aqueous fire-fighting composition of para. 32 comprising about 4.0 wt. % cocamidopropyl hydroxysultaine, about 3.2 wt. % sodium octyl sulfate, about 3.2 wt. % triethanolamine lauryl sulfate, and about 1.2 wt. % decyl sulfate.

Para. 34. The fluorine-free aqueous fire-fighting composition of para. 33 comprising about 4.0 wt. % cocamidopropyl hydroxysultaine, about 3.2 wt. % sodium octyl sulfate, about 3.2 wt. % triethanolamine lauryl sulfate, and about 1.6 wt. % decyl sulfate.

Para. 35. The fluorine-free aqueous fire-fighting composition of para. 34 wherein the organic solvent system comprises butyl carbitol, ethylene glycol, glycerine, or mixtures thereof.

Para. 36. The fluorine-free aqueous fire-fighting composition of para. 35 comprising about 4 to 6 wt. % butyl carbitol, about 1 to 3 wt. % ethylene glycol, and about 0.1 to 1 wt. % glycerine.

Para. 37. The fluorine-free aqueous fire-fighting composition of para. 46 wherein the sugar component comprises glucose, fructose, or mixtures thereof.

Para. 38. The fluorine-free aqueous fire-fighting composition of para. 37 wherein the foam comprises about 12 to 20 wt. % sugar component.

Para. 39. The fluorine-free aqueous fire-fighting composition of para. 38, wherein the divalent salt comprises magnesium sulfate.

Para. 40. The fluorine-free aqueous fire-fighting composition of para. 39, wherein the anti-microbial agent comprises tolyltriazole.

Para. 41. The fluorine-free aqueous fire-fighting composition of para. 40, wherein the composition further comprises about 1 to 3 wt. % magnesium sulfate, about 0.05 to 0.2 wt. % preservative, and about 0.01 to 0.1 wt. % tolyltriazole.

Para. 42. A fluorine-free aqueous fire-fighting composition comprising: about 15 to 20 wt. % of a sugar component, which comprises at least about 85 wt. % monosaccharide sugar; about 5 to 10 wt. % $C_8$-$C_{14}$ alkyl sulfate anionic surfactant; about 2 to 7 wt. % cocamidopropyl hydroxysultaine; about 5 to 10 wt. % of a water-miscible solvent mixture comprising butyl carbitol, ethylene glycol and glycerine; about 0.5 to 3 wt. % polysaccharide thickener comprising xanthan gum and diutan gum; magnesium salt; and at least about 50 wt. % water; wherein the composition does not contain any amine oxide or nonionic surfactant and is substantially free of fluorinated compounds.

Para. 43. The fluorine-free aqueous fire-fighting composition of para. 42, wherein the sugar component comprises at least about 85 wt. % of a mixture of glucose and fructose; and the $C_8$-$C_{14}$ alkyl sulfate anionic surfactant comprises a mixture of an octyl sulfate salt, a decyl sulfate salt and a lauryl sulfate salt.

Para. 44. The fluorine-free aqueous fire-fighting composition of para. 42 or 43 comprising about 4 to 6 wt. % butyl carbitol, about 1 to 3 wt. % ethylene glycol, about 0.1 to 1 wt. % glycerine and about 0.5 to 2 wt. % triethanolamine.

Para. 45. A method of forming a firefighting foam, comprising: mixing the firefighting foam composition of any of paras. 1 to 44 with an aqueous diluent to form a foam precursor solution; and aerating the foam precursor solution to form the firefighting foam.

Para. 46. The method of para. 45, wherein the aqueous diluent is selected from the group consisting of fresh water, brackish water, sea water, and combinations thereof.

Para. 47. A firefighting foam comprising the firefighting foam composition of any of paras. 1 to 44 and an aqueous diluent.

Para. 48. A method of fighting a fire comprising applying the firefighting foam of para. 47 to the fire.

Para. 49. A fluorine-free aqueous fire-fighting composition comprising: about 10 to 25 wt. % monosaccharide sugar; about 5 to 10 wt. % anionic surfactant, which comprises one or more of octyl sulfate salt, decyl sulfate salt and lauryl sulfate salt; about 2 to 7 wt. % zwitterionic surfactant, which comprises cocamidopropyl hydroxysultaine; about 2 to 10 wt. % of a water-miscible solvent mixture comprising diethylene glycol monobutyl ether; about 0.3 to 5 wt. % polysaccharide thickener comprising a mixture of (a) xanthan gum and (b) diutan gum, welan gum, or a mixture thereof; magnesium salt; and at least about 50 wt. % water; wherein the composition does not contain nonionic surfactant.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof

What is claimed is:

1. An aqueous fire-fighting composition comprising:

a sugar component, which comprises monosaccharide sugar and/or sugar alcohol;

anionic surfactant;

zwitterionic surfactant;

organic solvent comprising glycol ether and/or glycol solvent;

polysaccharide thickener; and at least about 40 wt. % water;

wherein the composition is substantially free of any amine oxide or nonionic surfactants; and the composition is substantially free of fluorinated compounds.

2. The aqueous fire-fighting composition of claim 1, wherein the composition comprises at least about 10 wt. % and, more commonly, about 10-25 wt. % of the sugar component.

3. The aqueous fire-fighting composition of claim 1, wherein the sugar component comprises at least about 75 wt. % monosaccharide sugar and/or sugar alcohol.

4. The aqueous fire-fighting composition of claim 1, wherein the sugar component comprises one or more of glucose, fructose, mannose, xylose, xylitol, sorbitol and mannitol.

5. The aqueous fire-fighting composition of claim 1, wherein the anionic surfactant comprises one or more of an aliphatic sulfate surfactant, an aliphatic sulfonate surfactant, an aliphatic succinate salt and an aliphatic ether sulfate surfactant.

6. The aqueous fire-fighting composition of claim 1, wherein the anionic surfactant comprises one or more of $C_8$-$C_{14}$ alkyl sulfate, a $C_8$-$C_{14}$ alkyl sulfonate and $C_{10}$-$C_{14}$ alkyl ether sulfate.

7. The aqueous fire-fighting composition of claim 1, wherein the anionic surfactant comprises one or more $C_8$-$C_{14}$ alkyl sulfate.

8. The aqueous fire-fighting composition of claim 1, wherein the anionic surfactant comprises one or more of octyl sulfate salt, decyl sulfate salt and lauryl sulfate salt.

9. The aqueous fire-fighting composition of claim 1, wherein the composition comprises about 2 to 20 wt. % and, more commonly, about 5 to 15 wt. % of the anionic surfactant.

10. The aqueous fire-fighting composition of claim 1, wherein the zwitterionic surfactant comprises one or more of an aliphatic amidoalkyl betaine, an aliphatic sulfobetaine, an aliphatic amidoalkyl hydroxysultaine and an aliphatic hydroxysultaine.

11. The aqueous fire-fighting composition of claim 1, wherein the zwitterionic surfactant comprises one or more $C_8$-$C_{14}$ alkyl amidopropyl hydroxysultaine.

12. The aqueous fire-fighting composition of claim 1, wherein the organic solvent comprises one or more of diethylene glycol monobutyl ether, ethylene glycol monophenyl ether, dipropylene glycol monobutyl ether, dipropylene glycol monomethyl ether, 1,6-hexanediol, 1,12-dodecanediol, ethylene glycol, hexylene glycol, propylene glycol and glycerine.

13. The aqueous fire-fighting composition of claim 1, wherein the sugar component contains a total of no more than about 10 wt. % disaccharide sugars and oligosaccharides.

14. The aqueous fire-fighting composition of claim 1, wherein the polysaccharide thickener comprises one or more of xanthan gum, diutan gum, rhamsan gum, welan, gellan gum, guar gum, konjac gum, tarn gum, and methylcellulose.

15. The aqueous fire-fighting composition of claim 1, wherein the polysaccharide thickener comprises one or more of xanthan gum, diutan gum and rhamsan gum.

16. The aqueous fire-fighting composition of claim 1 further comprising a reducing agent.

17. A fluorine-free aqueous fire-fighting composition comprising:

about 10 to 25 wt. % monosaccharide sugar;

about 5 to 10 wt. % anionic surfactant, which comprises one or more of octyl sulfate salt, decyl sulfate salt and lauryl sulfate salt;

about 2 to 7 wt. % zwitterionic surfactant, which comprises cocamidopropyl hydroxysultaine;

about 2 to 10 wt. % of a water-miscible solvent mixture comprising diethylene glycol monobutyl ether;

about 0.3 to 5 wt. % polysaccharide thickener comprising a mixture of (a) xanthan gum and (b) diutan gum, welan gum, or a mixture thereof;

magnesium salt; and at least about 50 wt. % water;

wherein the composition does not contain nonionic surfactant.

18. A method of forming a firefighting foam, comprising:

mixing the firefighting foam composition of claim 1 with an aqueous diluent to form a foam precursor solution; and aerating the foam precursor solution to form the firefighting foam.

19. The method of claim 18, wherein the aqueous diluent is selected from the group consisting of fresh water, brackish water, sea water, and combinations thereof.

20. A method of fighting a fire comprising applying the firefighting foam of claim 18 to the fire.

* * * * *